(12) United States Patent
Yang

(10) Patent No.: US 9,329,050 B2
(45) Date of Patent: *May 3, 2016

(54) ELECTRONIC DEVICE WITH OBJECT INDICATION FUNCTION AND AN OBJECT INDICATING METHOD THEREOF

(71) Applicant: Acer Incorporated, New Taipei (TW)

(72) Inventor: Chao-Kuang Yang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,056

(22) Filed: Jul. 18, 2014

(65) Prior Publication Data

US 2014/0330512 A1 Nov. 6, 2014

Related U.S. Application Data

(63) Continuation of application No. 12/609,182, filed on Oct. 30, 2009, now Pat. No. 8,838,375.

(30) Foreign Application Priority Data

May 11, 2009 (TW) .............................. 98115561 A

(51) Int. Cl.
*G01C 21/00* (2006.01)
*G01C 21/36* (2006.01)
*G01S 19/53* (2010.01)

(52) U.S. Cl.
CPC ............ *G01C 21/3667* (2013.01); *G01C 21/00* (2013.01); *G01S 19/53* (2013.01)

(58) Field of Classification Search
CPC combination set(s) only.
See application file for complete search history.

(56) References Cited

U.S. PATENT DOCUMENTS

| 2006/0004514 | A1  | 1/2006  | Bennett et al. |
| 2008/0204361 | A1* | 8/2008  | Scales et al. ...................... 345/8 |
| 2008/0319646 | A1  | 12/2008 | Hopkins et al. |
| 2009/0187339 | A1  | 7/2009  | DeVries et al. |
| 2010/0018285 | A1* | 1/2010  | Murphy et al. ................ 73/1.79 |
| 2011/0173565 | A1* | 7/2011  | Ofek et al. .................... 715/790 |
| 2011/0282572 | A1  | 11/2011 | DeVries et al. |
| 2013/0038522 | A1* | 2/2013  | Nara et al. .................... 345/156 |

FOREIGN PATENT DOCUMENTS

| TW | I280403   | 5/2007 |
| TW | 200912360 | 3/2009 |

OTHER PUBLICATIONS

"Office Action of Taiwan counterpart application" issued on Aug. 23, 2012, p. 1-p. 6.

* cited by examiner

*Primary Examiner* — Edward J Pipala
(74) *Attorney, Agent, or Firm* — Edell, Shapiro & Finnan, LLC

(57) ABSTRACT

The present invention discloses an electronic device with object guiding function and the method thereof. In one embodiment, the electronic device includes a view window area, via which a user may watch a view. The electronic device may determine whether an object is located in the view window area when the user inputs the position of the object, and may further show an object indicating message or an object guiding message according to the determination result. Therefore, the electronic device is able to provide the user with short distance guiding function. In another embodiment, the electronic device may also show information related to the object located in the view window area, such as information about every mountain range, constellation, user's friends, or specific landmark that is located in the view window area.

20 Claims, 10 Drawing Sheets

ELECTRONIC DEVICE WITH OBJECT INDICATION FUNCTION AND AN OBJECT INDICATING METHOD THEREOF

RELATED APPLICATION DATA

This application is a continuation of application Ser. No. 12/609,182, filed Oct. 30, 2009, which claims priority under 35 U.S.C. §119 to Taiwan patent application TW 98115561, filed on May 11, 2009. The entirety of each of the above-mentioned patent applications is hereby incorporated by reference herein and made part of this specification.

BACKGROUND

1. Technology Field

The present invention relates to an electronic device with object guiding function and the method thereof, and more particularly to an electronic device which may display an object indicating message or an object guiding message in a view window area and the method thereof.

2. Description of Related Art

Thanks to the matured technology and the popularization of the global positioning system (GPS), various kinds of satellite navigation devices have been developed and become a reliable and prerequisite guiding tool for drivers or travelers. By receiving positioning signals from at least three GPS satellites, the satellite navigation device may calculate its geographical coordinates. The navigation device may be used with an appropriate electronic map to provide the user with the information about the user's current position. Furthermore, when the user inputs a destination, the satellite navigation device may calculate based on the electronic map to plan out a path to the destination and guides the user to drive through the planned path.

However, the currently available civilian GPS is subject to limited accuracy. That is, the civilian GPS does not always provide highly precise positioning, and the positioning error varies with the user's current position and may range from several ten meters to several hundred meters. Therefore, particularly in cities, there are chances the satellite navigation device informs the user the destination is reached but the user fails to see the destination or is blocked by something on the way to the destination and gets lost. Besides, the satellite navigation device seems to be less useful when the user needs short-distance navigation aid.

SUMMARY

A primary object of the present invention is to provide an electronic device with object guiding function, and an object guiding method applicable to the electronic device, so as to guide a user to approach an object that is located within a relatively short distance from the user.

To achieve the above and other objects, the electronic device with object guiding function according to a first embodiment of the present invention to help a user to locate an object includes a positioning unit, a viewing unit, a data receiving unit, and a processing unit. The positioning unit provides a current position and a current orientation of the electronic device; the viewing unit includes a view window area, via which the user watches a view; the data receiving unit receives data about the position of an object; and the processing unit determines whether the object is located within a coverage of the view according to the current position and the current orientation of the electronic device, the view window area, and the position of the object. The processing unit further generates an object indicating message or an object guiding message based on the above determination about the position of the object, and the viewing unit correspondingly shows the object indicating message or the object guiding message in the view window area.

In an operable embodiment of the present invention, the viewing unit further includes an image acquisition module, an optical module, or a light-transmitting mechanism.

In another operable embodiment of the present invention, the viewing unit further includes a display module or a projection module for displaying the object indicating message or the object guiding message.

When it is determined the object is located in the coverage of the view, the processing unit generates the object indicating message and controls the viewing unit to show the object indicating message. On the other hand, when it is determined the object is not located in the coverage of the view, the processing unit generates the object guiding message and controls the viewing unit to show the object guiding message.

In the first embodiment of the present invention, preferably, the object may be a constellation, a building, a mountain range, a moving object, or a person.

The electronic device with object guiding function according to a second embodiment of the present invention includes a positioning unit, a viewing unit, a data storage module and a processing unit. The positioning unit provides a current position and a current orientation of the electronic device; the viewing unit includes a view window area, via which a user may watch a view; the data storage module records related information and locations of a plurality of objects; and the processing unit determines what a subject object is located in a coverage of the view according to the current position and the current orientation of the electronic device, the view window area, and the locations of the plurality of objects, and the related information of the subject object located in the coverage of the view is correspondingly shown by the viewing unit in the view window area.

In an operable embodiment of the present invention, the viewing unit further includes an image acquisition module, an optical module, or a light-transmitting mechanism.

In another operable embodiment of the present invention, the viewing unit further includes a display module or a projection module for displaying the related information of the subject object located in the coverage of the view.

In the second embodiment of the present invention, the object may be a constellation, a building, a mountain, a moving object, or a person.

The object guiding method according to the present invention is applicable to an electronic device having a viewing unit that includes a view window area, via which a user watches a view. The method includes the following steps. A position of an object is obtained. A current position and a current orientation of the electronic device are obtained. It is determined whether the object is located in a coverage of the view according to the current position and the current orientation of the electronic device, the view window area, and the position of the object. An object indicating message or an object guiding message are generated according to the determination about the location of the object. The object indicating message or the object guiding message are shown correspondingly in the view window area.

According to the method of the present invention, when it is determined the object is located in the coverage of the view, the object indicating message is generated and shown. On the other hand, when it is determined the object is not located in the coverage of the view, and then the object guiding message is generated and shown.

In an operable embodiment of the present invention, the viewing unit includes an image acquisition module and a display unit, and the method further includes the steps of using the image acquisition module to acquire an image signal of the view, showing the image signal on the display unit, and showing the object indicating message or the object guiding message on the display unit. And, the display unit has a screen defined as the view window area, via which the user may watch the image of the view.

In another operable embodiment of the present invention, the viewing unit includes an optical lens module, an eyepiece module and a display unit, and the method further includes the steps of using the optical lens module to receive an optical signal of the view and form an image in the view window area, allowing the user to watch the view window area via the eyepiece module, and correspondingly showing the object indicating message or the object guiding message in the view window area.

BRIEF DESCRIPTION OF THE DRAWINGS

The structure and the technical means adopted by the present invention to achieve the above and other objects may be best understood by referring to the following detailed description of the preferred embodiments and the accompanying drawings, wherein.

DESCRIPTION OF THE EMBODIMENTS

Figure 1:
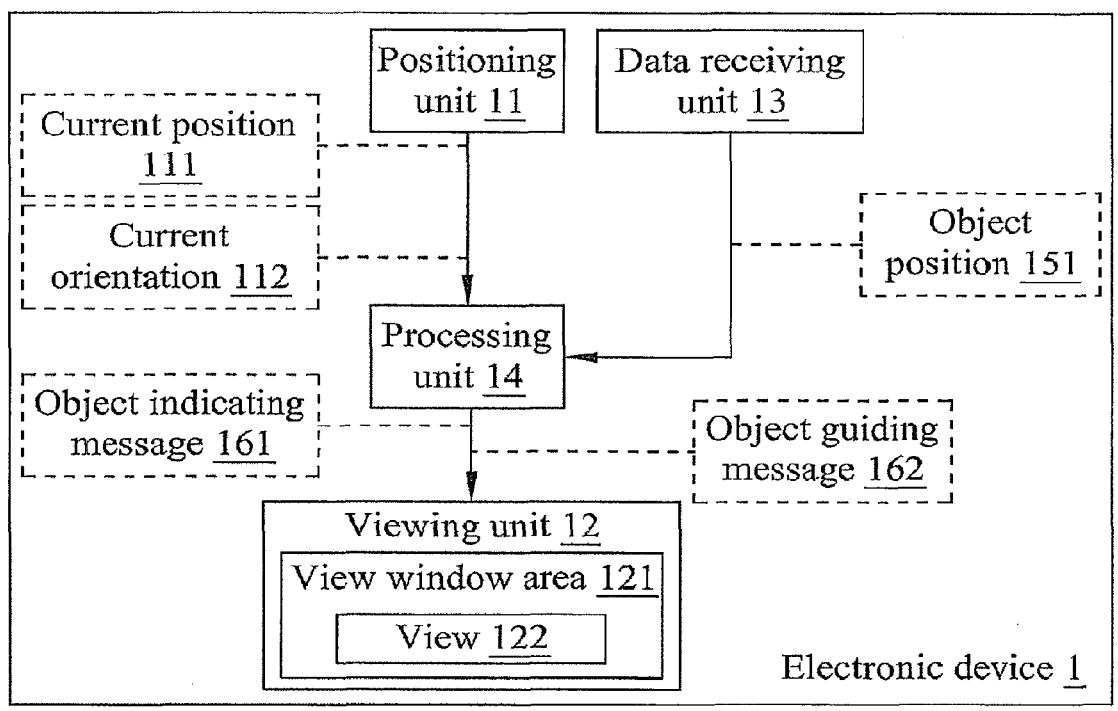
FIG. 1 is a block diagram of an electronic device with object guiding function according to the present invention.

Please refer to FIG. 1 that is a block diagram of an electronic device with object guiding function according to the present invention, which is generally denoted by reference numeral 1 and also briefly referred to as the electronic device 1 herein, and to FIGS. 2 to 5 that are schematic views showing the operation of the electronic device 1. As may be seen from FIG. 1, the electronic device 1 includes a positioning unit 11, a viewing unit 12, a data receiving unit 13, and a processing unit 14. The positioning unit 11 provides the current position 111 and the current orientation 112 of the electronic device 1. Preferably, the positioning unit 11 is a global positioning system (GPS) module, an assisted global positioning system (AGPS) module, an electronic compass, or a gyroscope. The GPS module and the AGPS module are able to calculate the geographic coordinates of the electronic device 1; and the electronic compass or the gyroscope is able to provide 2D or 3D orientation of the electronic device 1. The viewing unit 12 includes a view window area 121, via which a user may watch a view 122. Depending on actual need, the viewing unit 12 may include an image acquisition module, an optical module, or a light-transmitting mechanism for receiving optical signals, and a display module or a projection module for displaying related information.

The data receiving unit 13 receives data about the position 151 of an object 15. The object 15 is preferably a constellation, a building, a mountain range, a moving object, or a person. Depending on actual need, the data receiving unit 13 may include a network linking module or a wireless communication module for receiving object data transmitted from a remote location. The data receiving unit 13 may also include an input module and a data storage module according to actual need, allowing a user to select on the electronic device 1 an object stored in the data storage module. The viewing unit 12 may show at least one selectable object stored in the data storage module, and a user may select one of the selectable objects via the input module. The input module may be a keyboard, a keypad, a cursor controller, or a touch-control module.

The processing unit 14 calculates based on the current position 111, the current orientation 112, and the view window area 121 of the electronic device 1 to obtain a coverage 123 of the view 122 shown in the view window area 121, and then, based on the position 151 of the object 15, determines whether the object 15 is located in the coverage 123 of the view 122 and generates an object indicating message 161 or an object guiding message 162 according to the above determination. The processing unit 14 is preferably a microcontroller or a central processing unit (CPU). And, the coverage 123 is preferably defined as an area extended from an angle of view 1231 of the viewing unit 12, and may be a 2D area or a 3D space.

Figure 2:
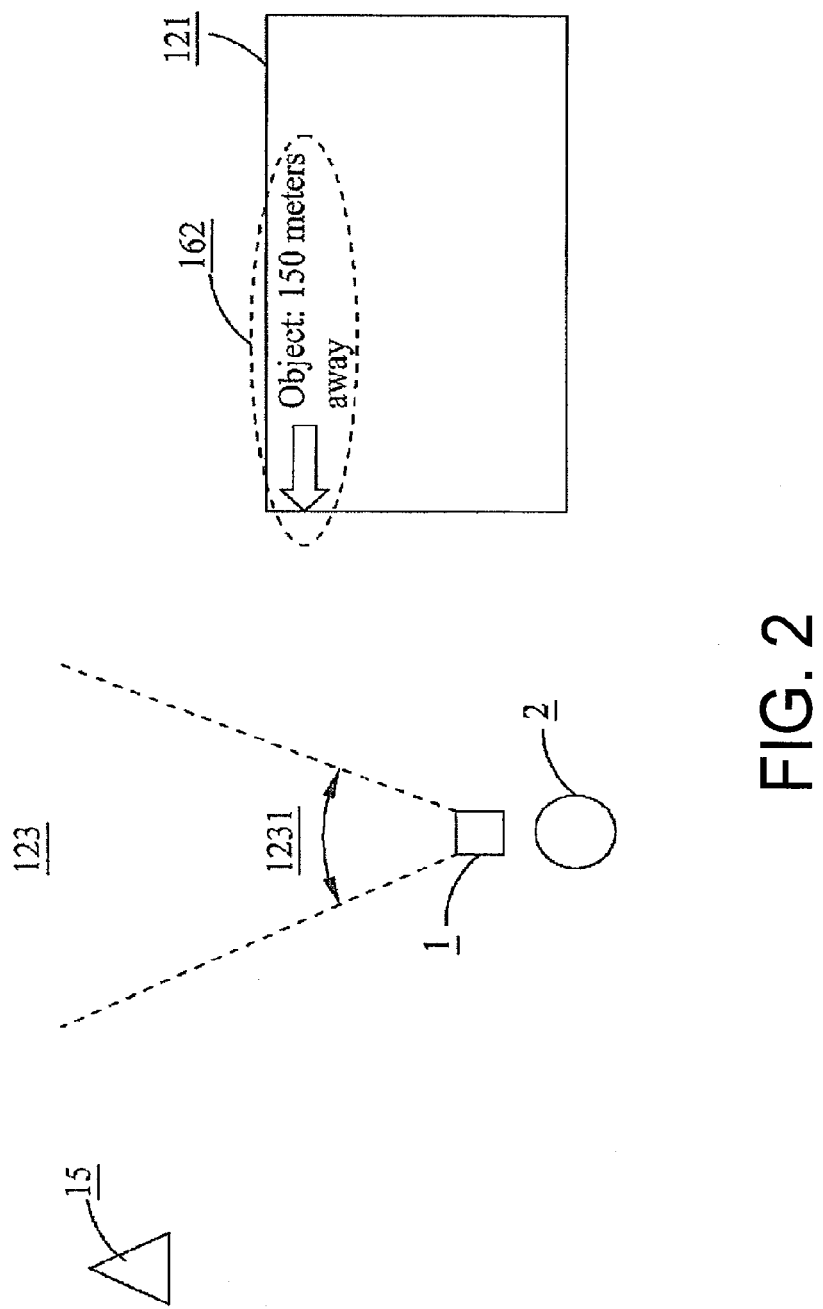
FIGS. 2 to 5 are schematic views showing the operation of the electronic device with object guiding function according to the present invention.
Figure 3:
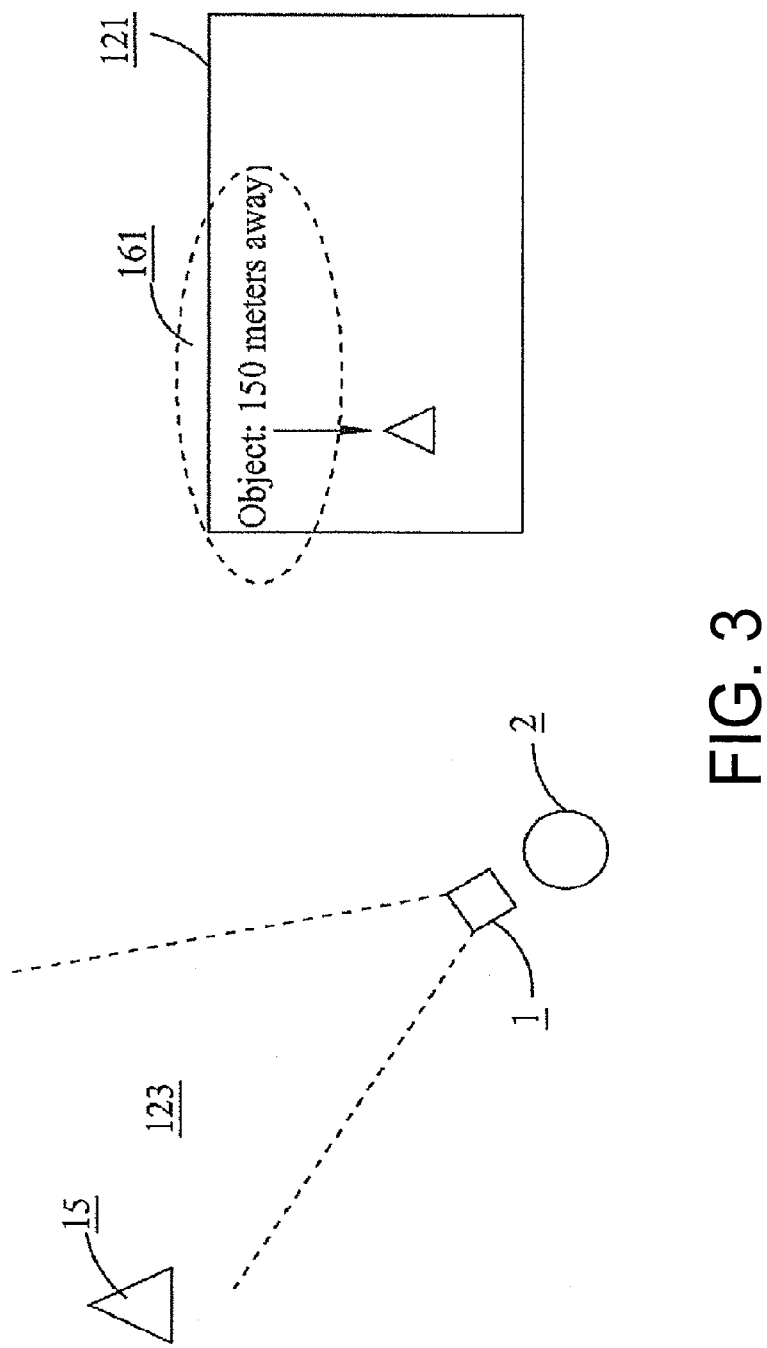
Figure 4:
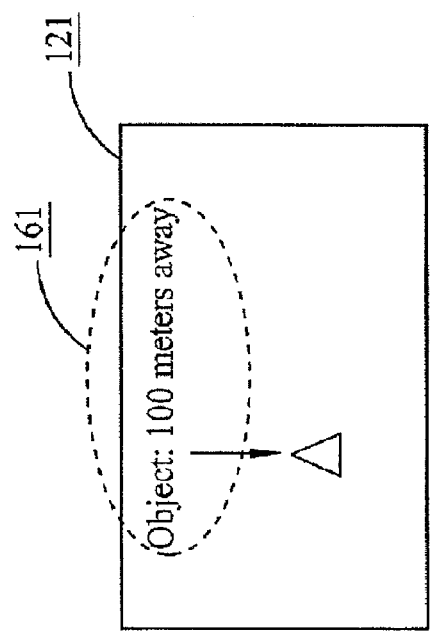
Figure 4:
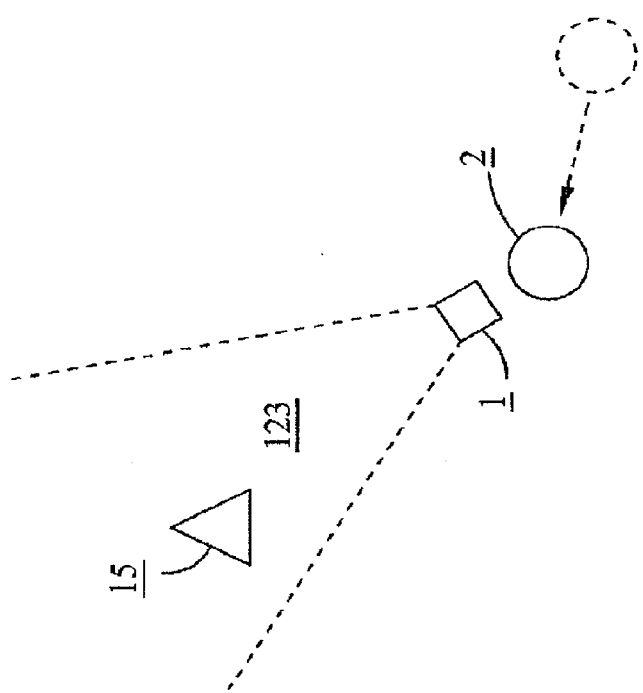

The viewing unit 12 correspondingly shows the object indicating message 161 or the object guiding message 162 in the view window area 121. The object guiding message 162 may be used to guide a user 2 to change the electronic device 1 to a different orientation, so that the object 15 may be located in the view window area 121. As shown in FIG. 2, the object guiding message 162 reminds the user 2 to turn left for the object 15 to move into the coverage 123. On the other hand, the object indicating message 161 indicates information about the object 15, such as the name, the image, the attribution, or the address of the object, the position of the object 15 in the view window area 121, or the distance between the object 15 and the electronic device 1. As shown in FIG. 3, the object indicating message 161 reminds the user of a position of the object 15 in the view window area 121, and indicates the object 15 is distant from the electronic device 1 by 150 meters. Thus, even if the object 15 may not be directly shown in the view window area 121, the user 2 may still know from the object indicating message 161 the orientation of and the distance to the object 15. Further, the electronic device 1 is able to constantly update the object indicating message 161. As shown in FIG. 4, when the user 2 moves to a new position, the electronic device 1 also updates the position of the object indicating message 161 in the view window area 121, and updates the distance between the object 15 and the electronic device 1 to read 100 meters.

Figure 5:
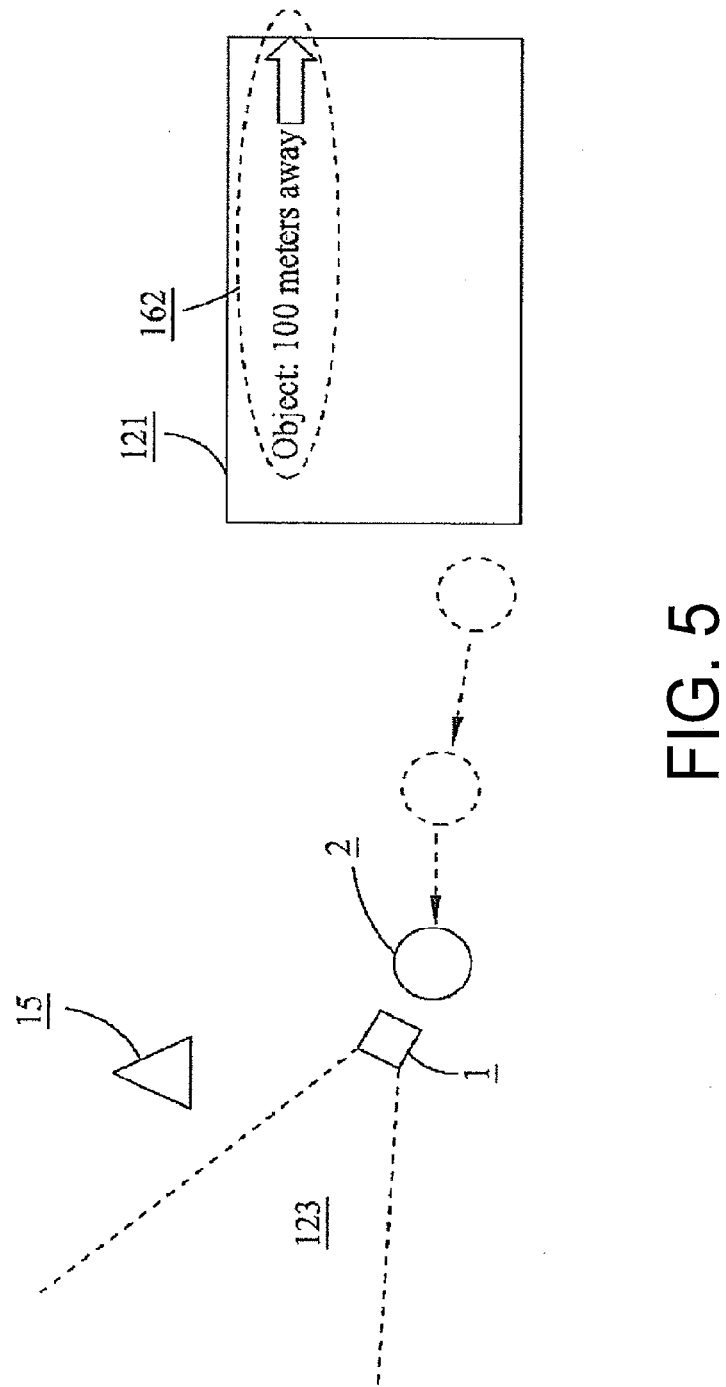

In the case the user 2 is navigated to a destination but fails to locate the exact address of the destination, the user may first determine the orientation of the destination through the above-described operations to gradually approach the destination. If the destination could not be straightly reached due to roads or other constructions, and the object 15 moves out of the coverage 123 of the view 122 when the user 2 turns while approaching to the destination, the electronic device 1 will change to show the object guiding message 162 to remind the user that, for example, the object 15 is now located at the right side of the user 2, as shown in FIG. 5. In this manner, the user 2 may be effectively guided to reach at the destination. The object guiding message 162 is not only limited to remind the user to move leftward or rightward, but also remind the user to move upward or downward and forward or backward, depending on the actual design of the electronic device 1.

In the case there is constellation information stored thereon, the electronic device 1 may also be used to guide the user to observe a specific constellation. And, the electronic device 1 may also be used to guide the user to approach to a moving object, such as the user's friend or family in moving, if the electronic device 1 is able to continuously receive the position of the moving object.

Figure 6:
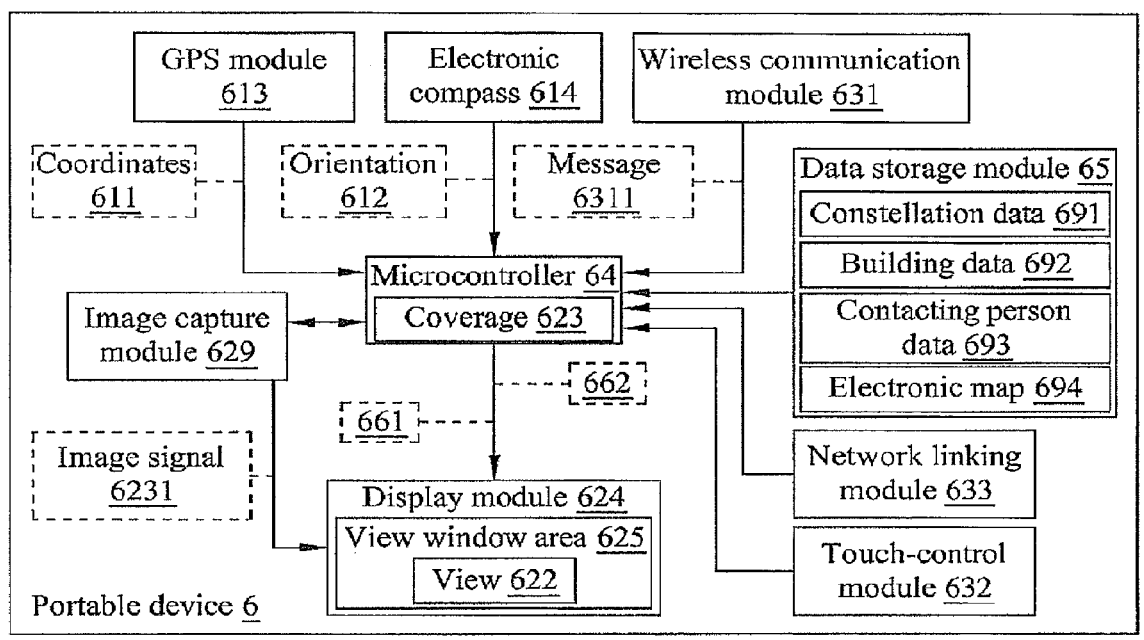
FIG. 6 is a block diagram of an electronic device with object guiding function according to a first embodiment of the present invention.

FIG. 6 is a block diagram of an electronic device with object guiding function according to a first embodiment of the present invention. In the first embodiment, the electronic device is a portable device 6, which includes a GPS module 613, an electronic compass 614, an image acquisition module 629, a display module 624, a wireless communication module 631, a touch-control module 632, a network linking module 633, a microcontroller 64, and a data storage module 65. The GPS module 613 receives a plurality of satellite signals and calculates these satellite signals to derive coordinates 611 of the portable device 6. The electronic compass 614 outputs the orientation 612 of the portable device 6. Since the function and the operating principle of the GPS module 613 and the electronic compass 614 are known by one of ordinary skill in the art, they are not discussed in details herein. The image acquisition module 629 acquires an image signal 6231 corresponding to an external view 622. The microcontroller 64 controls the display module 624 to show the image signal 6231. The display module 624 has a screen defined as a view window area 625. Via the view window area 625, a user may watch the image of the view 622 acquired by the image acquisition module 629.

The data storage module 65 has a plurality of object data stored therein, such as constellation data 691, building data 692, contacting person data 693, and an electronic map 694. The constellation data 691 includes the position of at least one constellation or related information about the constellation. Based on the constellation data 691, the current time and the current coordinates of the portable device 6, the microcontroller 64 is able to calculate and derive the orientation of the constellation. The building data 692 includes the position of at least one building or related information about the building. The contacting person data 693 includes the address or position of at least one contacting person or related information about the contacting person. The electronic map 694 includes a plurality of road information. The user may operate the touch-control module 632 to select one of the object data stored in the data storage module 65.

The microcontroller 64 may calculate an angle of view of the image acquisition module 629 based on an imaging model of the image acquisition module 629, such as a pinhole model, and the imaging area and focal length of the image acquisition module 629, so as to derive a coverage 623 of the view 622 acquired by the image acquisition module 629. In the case the user does not select a desired guide mode on the portable device 6, the microcontroller 64 may compare the object data stored in the data storage module 65 with the coverage 623 to determine what objects are located in the coverage 623. Herein, the objects in the coverage 623 are objects that may be seen by the user via the view window area 625. Then, the microcontroller 64 generates at least one object indicating message 661.

In the case the user selects a desired guiding mode on the portable device 6, the microcontroller 64 will compare the user-selected object with the coverage 623 to determine whether the selected object is located in the coverage 623. If yes, the microcontroller 64 generates an object indicating message 661 corresponding to the selected object. On the other hand, when the selected object is not located in the coverage 623, the microcontroller 64 will determine the selected object is located at which side of the coverage 623 to thereby generate an object guiding message 662. For instance, when it is determined the selected object is located at a left side of the coverage 623, the microcontroller 64 will generate an object guiding message to guide the user to turn left, as shown in FIG. 2.

Figure 7:
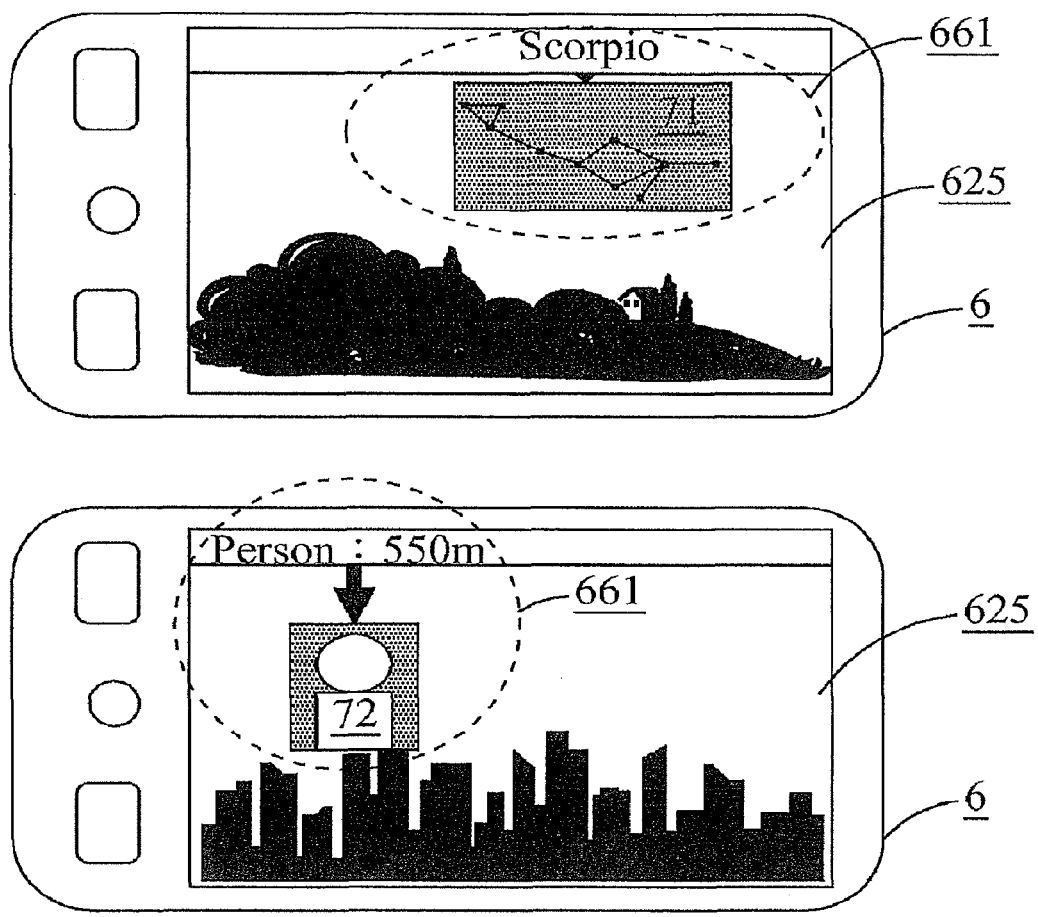
FIG. 7 shows the electronic device of FIG. 6 in use.

The microcontroller 64 also controls the display module 624 to show the object indicating message 661 or the object guiding message 662 at an adequate position in the view window area 625. For example, an object guiding message 662 reminding the user to move leftward is shown near a left side of the view window area 625, and an object guiding message 662 reminding the user to move rightward is shown near a right side of the view window area 625; and an object indicating message 661 is shown near an upper side of the view window area 625. The object indicating message 661 may also include a figure or a photo of the object. For example, as shown in FIG. 7, when the object is a constellation, the displayed object indicating message 661 may include a FIG. 71 of the constellation; or when the object is a contacting person, the displayed object indicating message 661 may include a photo 72 of the contacting person.

In addition to select an object from the data storage module 65 by the user to serve as a guiding basis for the portable device 6, the user may also utilize short message service (SMS) or multimedia message service (MMS) to request his or her friend or family to transmit a communication message 6311 capable of indicating the friend's or the family's current position, so that the portable device 6 may receive the communication message 6311 via the wireless communication module 631. In the case the communication message 6311 includes geographic coordinates indicating the position of the user's friend, the microcontroller 64 may directly compare these geographic coordinates with the coverage 623. In the case the communication message 6311 includes the friend's address or the name of the friend's current location, such as a restaurant name or a building name, the microcontroller 64 will determine the friend's current coordinates according to the electronic map 694, and then compares the determined coordinates with the coverage 623.

Further, the portable device 6 may also receive the coordinates of the object via the network linking module 633. For example, the user may browse web pages via the network linking module 633 to obtain the position data of an object; and the portable device 6 may use the object position data to perform the above-mentioned guiding operations. Alternatively, when the user and his or her friend send instant messages to each other via the network linking module 633, the instant messages may also include the object position data, based on which the portable device 6 may perform the above-mentioned guiding operations. When the received object position data is the position data of the friend sending the instant message, and the instant message is being continuously received, the user may use the portable device 6 and be guided to approach the friend in moving.

Figure 8:
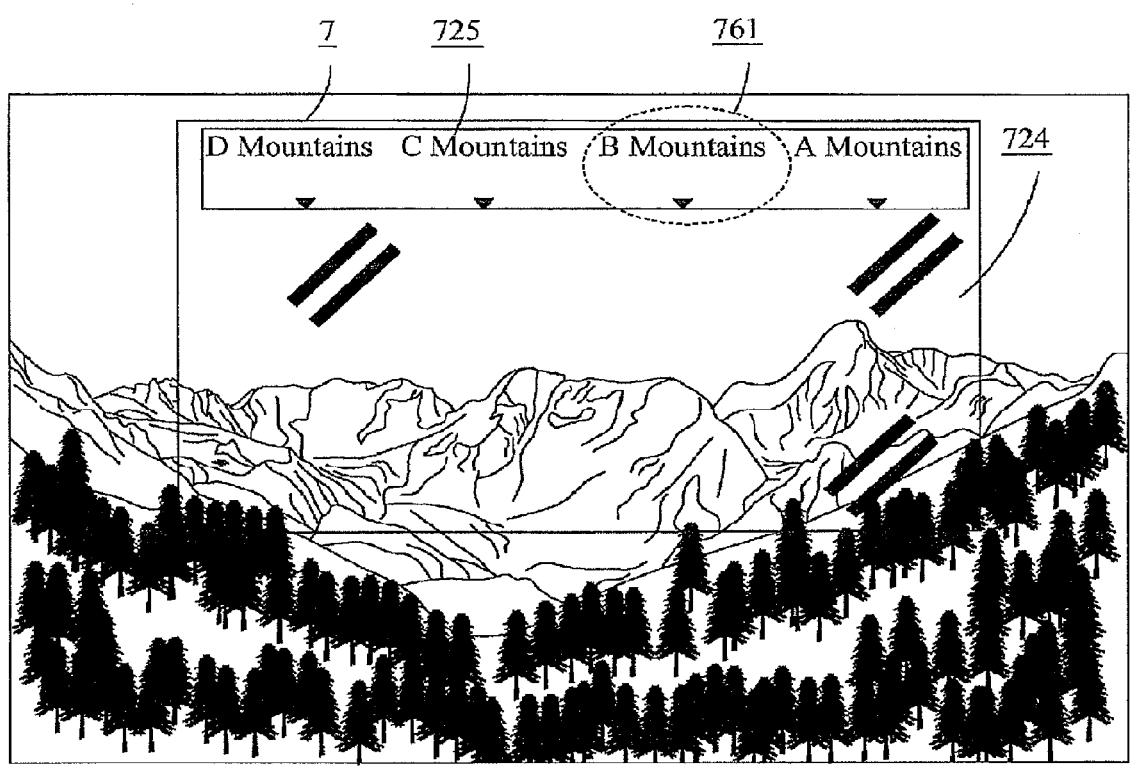
FIG. 8 shows an electronic device with object guiding function according to a second embodiment of the present invention in use.

Please refer to FIG. 8 that is a schematic view of an electronic device with object guiding function according to a second embodiment of the present invention. As shown, the electronic device in the second embodiment is a view observation device 7. The second embodiment is different from the first embodiment in that the view observation device 7 includes a light-transmitting mechanism 724 and a display module 725 to serve as the viewing unit. The light-transmitting mechanism 724 defines a view window area, and may be made of a light-pervious material, such as a glass material or an acrylate material, or simply a frame. Based on its own position and orientation and the area of the light-transmitting mechanism 724, the view observation device 7 is able to derive the coverage of the view being currently watched by the user using the view observation device 7, and further determines what objects are located in the coverage of the view, such as mountain ranges. Thereafter, the view observation device 7 may generate object indicating messages 761 corresponding to the objects in the coverage, such as Mountains A, Mountains B, Mountains C and Mountains D; and the object indicating messages 761 are shown in the display module 725. It is noted the positions of the object indicating messages 761 in the display module 725 also correspond to the mountain ranges located in the light-transmitting mechanism 724.

In the case the light-transmitting mechanism 724 is made of a glass material or an acrylate material, the display module 725 may be otherwise a projection module, which projects the corresponding object indicating messages 761 onto the glass or the acrylate for viewing by the user.

Figure 9:
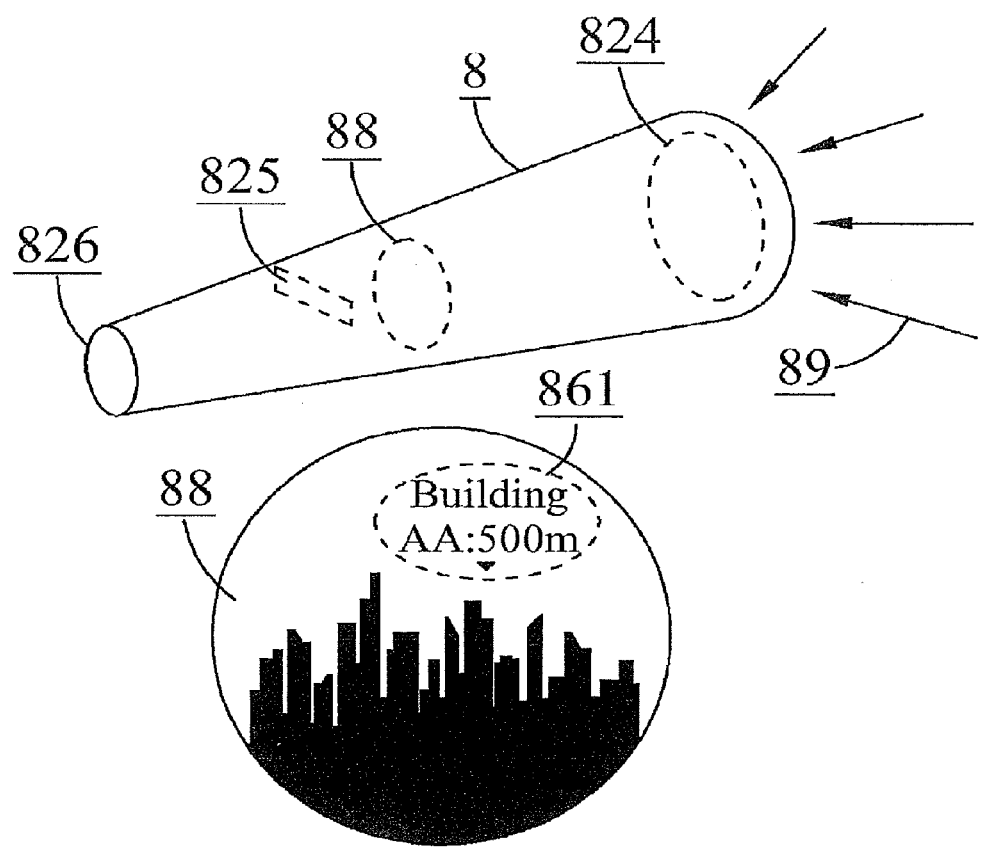
FIG. 9 shows an electronic device with object guiding function according to a third embodiment of the present invention in use.

FIG. 9 is a schematic view of an electronic device with object guiding function according to a third embodiment of the present invention. In the third embodiment, the electronic device is a telescope device 8. The third embodiment is different from other embodiments in that the telescope device 8 includes an optical lens module 824, a projection module 825, and an eyepiece module 826 serving as a viewing unit. The optical lens module 824 receives an optical signal 89 of the view and forms an image in a view window area 88. A user may watch the view window area 88 via the eyepiece module 826. The projection module 825 correspondingly projects an object indicating message 861 or an object guiding message generated by a microcontroller of the telescope device 8 to shown the messages in the view window area 88. Since the generation of the object indicating message 861 or the object guiding message has been described in the above paragraphs, it is not discussed in more details herein.

Figure 10:
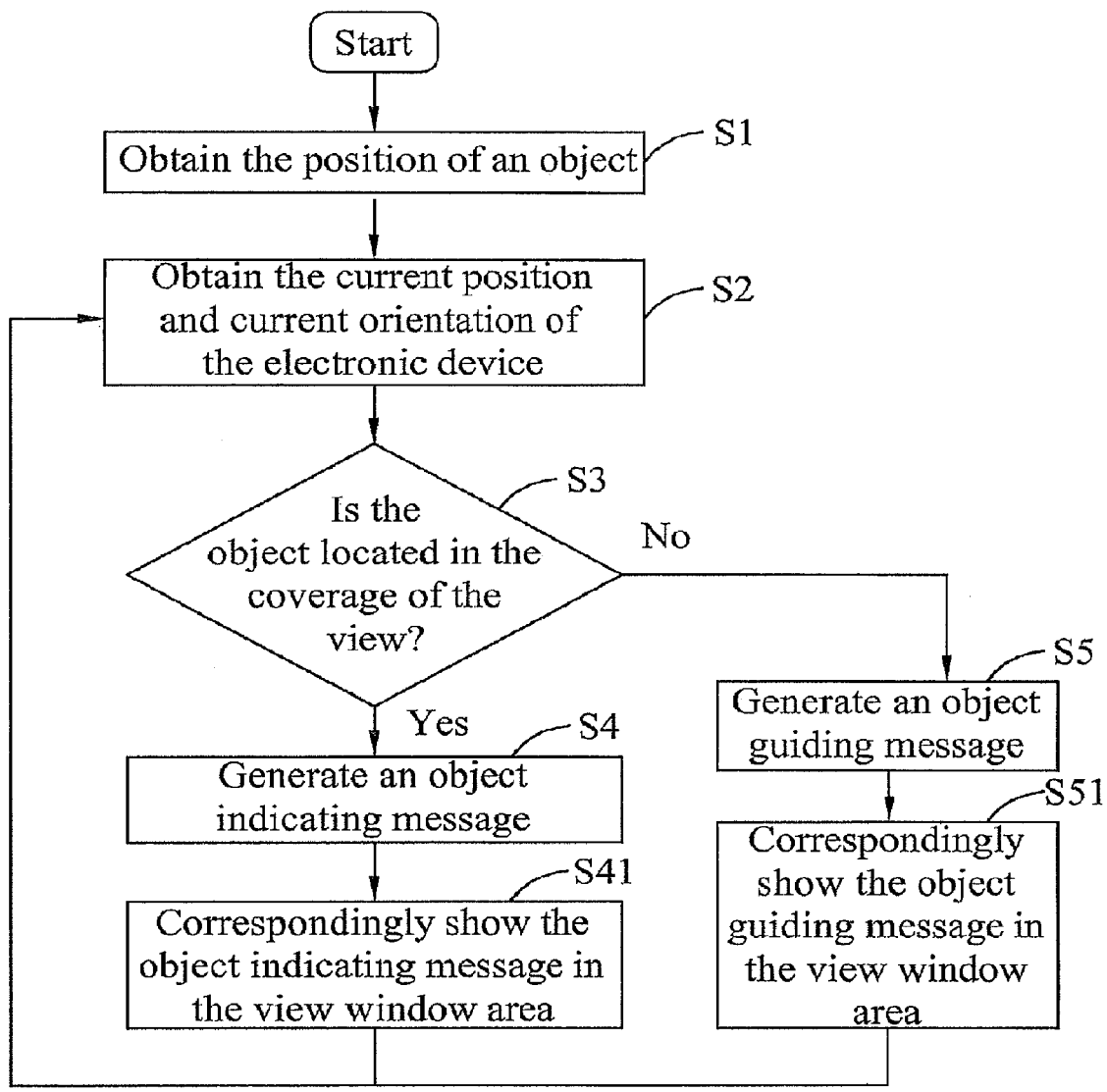
FIG. 10 is a flowchart showing the steps included in an object guiding method according to the present invention.

Please refer to FIG. 10, which is a flowchart showing the steps included in an object guiding method according to the present invention. The object guiding method is applicable to an electronic device with a viewing unit having a view window area, via which a user may watch a view. In a first step 51 of the method, an object position is obtained. The user may obtain the object position in different ways, including selecting one of many objects stored on the electronic device, linking the electronic device with Internet and selecting an object on a webpage, linking the electronic device with Internet and receiving an instant message, or using short message service (SMS) or multimedia message service (MMS).

Then, in a second step S2, the current position and the current orientation of the electronic device are obtained. The electronic device may be any one of the electronic devices illustrated in FIGS. 1, 6, 8 and 9 or other applicable electronic devices. Then, in a third step S3, determine whether the object is located in coverage of the view based on the current position and orientation of the electronic device, the view window area, and the object position. When the object is determined as being located in the coverage of the view, an object indicating message is generated in a fourth step S4. Thereafter, in a step S41 following the fourth step S4, the object indicating message is correspondingly shown in the view window area, such as the object indicating messages 161, 661, 761 and 861 respectively shown in FIGS. 2, 7, 8 and 9. The object indicating message may include, depending on actual need, a figure of the object, a photo of the object, or a distance between the object and the electronic device.

On the other hand, when the object is determined as not being located in the coverage of the view, an object guiding message is generated in a fifth step S5. Thereafter, in a step S51 following the fifth step S5, the object guiding message is correspondingly shown in the view window area. The object guiding message may be, for example, the object guiding message 162 shown in FIG. 2. After the step S41 or the step S51, the step S2 is repeated. Or, when the object is a moving object, such as a contacting person in moving, the step S1 is repeated after the step S41 or the step S51 to receive the new position of the moving object.

Further, in the case the viewing unit in the above embodiments has picture shooting function, the object indicating message may be stored along with picture data while the picture is taken and be recorded as the metadata or the tag information of a JPEG file. In this manner, the object indicating message may also be seen when the user views the picture at a later time.

The present invention has been described with some preferred embodiments thereof and it is understood that many changes and modifications in the described embodiments may be carried out without departing from the scope and the spirit of the invention that is intended to be limited only by the appended claims.

What is claimed is:

1. A method of providing information about an object to a user of an electronic device, the electronic device having a display, the method comprising:
   establishing a view that the user can see via the electronic device, the view being captured by an image acquisition module such that a user can watch an image of the view;
   identifying an object within the view;
   generating an object indicating message including information relating to the object; and
   displaying the object indicating message on the display of the electronic device.

2. The method of claim 1, wherein establishing the view is based on a current position and current orientation of the electronic device.

3. The method of claim 2, wherein determining the current position of the electronic device comprises receiving and processing global positioning satellite (GPS) data.

4. The method of claim 1, wherein identifying the object within the view comprises accessing a storage module of the electronic device.

5. The method of claim 1, wherein the object indicating message comprises an image, picture, or photograph of the object or a distance between the object and the electronic device.

6. The method of claim 5, wherein the image, picture or photograph is of a person.

7. The method of claim 1, wherein displaying the object indicating message comprises superimposing the object indicating message over the view.

8. The method of claim 1, further comprising displaying an object guiding message on the display of the electronic device.

9. The method of claim 8, further comprising displaying the object guiding message at a location on the display of the electronic device that is indicative of a direction in which the object is located relative to a location of the electronic device.

10. An apparatus for providing information about an object to a user, the apparatus, comprising:
- an image capture unit configured to capture an image signal within a view of a user such that a user can watch an image of the view;
- a display configured to display the view according to the image signal; and
- a processing unit configured to:
    - identify an object within the view;
    - generate an object indicating message including information relating to the object; and
    - cause the display to display the object indicating message superimposed over the display of the view.

11. The apparatus of claim 10, further a data storage module configured to store the information relating to the object.

12. The apparatus of claim 10, further comprising a wireless communication module configured to obtain the information relating to the object.

13. The apparatus of claim 10, further comprising an electronic compass operatively coupled to the processor.

14. The apparatus of claim 10, further comprising a global positioned system (GPS) module operatively coupled to the processor.

15. The apparatus of claim 10, wherein the object indicating message comprises an image, picture, or photograph of the object or a distance between the object and the apparatus.

16. The apparatus of claim 10, wherein the image, picture or photograph is of a person.

17. The apparatus of claim 10, wherein the processor is further configured to display an object guiding message on the display indicative of a direction to the object.

18. The apparatus of claim 17, wherein the processor is further configured to display the object guiding message at a location on the display that is indicative of a direction in which the object is located relative to a location of the apparatus.

19. The apparatus of claim 10, further comprising a network linking module configured to obtain position data of the object.

20. The apparatus of claim 10, wherein the object is a moving object.

* * * * *